May 9, 1961 M. G. LEESON 2,983,109
ICE MAKING MACHINE
Filed April 1, 1957 6 Sheets-Sheet 1

FIG. 1

INVENTOR
MELDON G. LEESON
BY
ATTORNEY

May 9, 1961  M. G. LEESON  2,983,109
ICE MAKING MACHINE
Filed April 1, 1957  6 Sheets-Sheet 5

INVENTOR.
MELDON G. LEESON
BY
Sidney N. Rosenfeld
ATTORNEY

United States Patent Office 2,983,109
Patented May 9, 1961

2,983,109

ICE MAKING MACHINE

Meldon G. Leeson, Spring Garden Township, York County, Pa., assignor to Borg-Warner Corporation, Chicago, Ill., a corporation of Illinois Filed Apr. 1, 1957, Ser. No. 650,001

16 Claims. (Cl. 62—73)

This invention relates to automatic small-ice producing machines. The invention more particularly relates to an automatic cube-ice maker. By "cube" is meant any small, solid piece of ice of whatever form or shape and it is not to be restricted to any specific geometric shape.

It will be apparent from a reading of the specification, however, that features of the invention are applicable to an automatic ice maker of any type, whether it produces "cubes" or small, irregular fragments of ice, such as the type of ice produced on the machine shown, for example, in the Raver Patent No. 2,308,541 which is owned by the assignee of my invention.

This invention relates to an automatic cube ice maker of the type wherein water is frozen to a surface for producing ice thereon. The water is circulated over the surface in greater quantities than is needed to produce the ice so that the ice frozen will have a clear, sparkling appearance, the excess water has a washing action on the ice, washing impurities therefrom. The excess water then flows from the surface into a water sump from which it is recirculated over the surface. Means are provided for adding make-up water to replace that portion of the water in the sump which has become frozen into ice. A refrigerant evaporator is positioned adjacent to the freezing surface and bonded thereto at spaced points or areas to produce the cubes of ice. It will be appreciated, however, that for many purposes of the invention, the evaporator could be positioned adjacent to the freezing surface and bonded thereto in such a manner that a solid sheet of ice is produced on the surface. Further, elongated columns of ice could be produced thereon, which, for the purposes of this specification, however, can still be termed "cubes." The ice-maker operates over two alternate cycles known as the freezing cycle, during which time the circulated water is frozen, and the harvesting cycle, when the bond between the ice and freezing surface is broken and the ice is released from the surface.

In automatic cube-ice makers of the type above noted and sold for production of cubes for use in restaurants, bars, and other commercial establishments, it is necessary to provide for automatic controls. Some means must be provided for automatically stopping the freezing cycle when the cubes are frozen to the desired size and for automatically initiating the harvesting cycle to free the cubes from the freezing surface. When the cubes are all harvested, then the freezing cycle must again be automatically started. While a timing device has proven satisfactory in some instances, it will be appreciated that in order to freeze a cube of uniform size, it is necessary to vary the freezing cycle because of the varying conditions of operation such as varying water temperatures, ambient temperatures, etc. It will be appreciated that with a high ambient air temperature the cubes will freeze more slowly than with a low ambient air temperature. Using a uniformly timed cycle, therefore, the size of the cubes will vary according to the ambient air temperature. It will also be appreciated that the reverse will be true on the harvesting cycle. That is, the higher the ambient the more quickly the cubes will be harvested. Therefore, where a time cycle is used, it must be long enough to provide for a complete harvesting of the cubes under the most adverse conditions encountered which will make for uneconomic operation during all but such adverse conditions of operation. The problem is further complicated by the variations in the temperature of the water supplied to the machine. It can be easily seen that with cold water the freezing will progress much more rapidly than with a higher temperature water. Again, with a uniformly timed cycle the size of the cube would vary according to temperature of the water supplied to the machine.

In the Grandia Patent No. 2,593,874, owned by my assignee, there is shown a control mechanism which will automatically adjust itself to varying outside conditions and uniformly produce a cube of the same size irrespective of varying ambient or water temperatures. The cubes are frozen in a tube and when any one of the cubes has built up to a point where there is restriction to the flow of water through the tube, the water backs up and is then diverted from the freezing tube to by-pass it on its passage back to the sump. A thermostatic control bulb is positioned in the path of the by-passed water and when the water passes thereover after being diverted from the freezing tube, a control is actuated which initiates the harvesting cycle. The control device, as shown in the Grandia patent, and applied to the type of automatic ice maker shown therein, in which cubes are frozen in a tube in such a manner that there is a restriction to the flow of water therethrough when the ice builds up to a predetermined point, had been considered inapplicable to other types of ice-makers wherein there can be no restriction to water flow.

It is an object of the invention to provide an ice maker of the type above noted and wherein ice is frozen to a surface such that no restriction to the flow of water can occur and a separate control freezing tube is provided wherein a control cube is frozen and when there is a restriction to flow of water in the control freezing tube by reason of the formation of ice therein, than a harvesting operation is initiated on the freezing surface.

It is a further object of this invention to provide an automatic ice-maker wherein primary cubes of ice are frozen on an ice freezing surface and wherein a separate control freezing tube is provided for freezing a control cube and means are provided responsive to restriction to flow of water in the control tube for initiating a harvesting cycle, the size of the primary cubes produced being proportional to the size of th econtrol freezing tube, whereby said primary cube size may be varied by varying the size of the control freezing tube.

It is a further object of the invention to provide an automatic ice-maker having a primary freezing tube wherein opposed cubes of ice are frozen on opposite sides thereof, and a control freezing tube for freezing a cube of ice capable of restricting water flow; and means are provided responsive to the restriction of the water flow in the control tube for initiating a harvesting operation, said control freezing tube being so proportioned that the control ice cube will freeze therein and restrict water flow prior to the cubes in the main freezing tube reaching such a size that opposed cubes will fuse together.

A still further object of the invention is to provide an automatic cube-ice maker having an ice freezing element comprising an ice freezing surface and in-turned end portions, said surface and end portions having an included angle therebetween greater than 90°, whereby when the bond between the ice cube and the surface is broken the cube frees itself from said surface without binding between said end portions. It will be apparent that if the included angle between the inturned end portions and the freezing surface is 90° or less, then there will be binding of the ice between the in-turned end portions when the bond between ice and surface is broken and it will be necessary to melt away an additional portion of the ice so that it may freely fall between the in-turned end portions.

A still further object of the invention is to provide an ice freezing assembly comprising a plurality of hexagonal tubes and wherein an evaporator is positioned in contact with opposite sides of said tubes to freeze opposed cubes therein and control means are provided for initiating a harvesting cycle before the cubes reach a size where they will be joined, the cubes then falling freely in the tubes without binding, as soon as the bond is broken because of said hexagonal shape.

It is a further object of the invention to form an ice freezing assembly of two folded surfaces, each surface so folded that in cross-section a plurality of half-hexagons are formed and when the two said surfaces are joined at the edges thereof there will be formed a plurality of hexagonal-like passageways there-between. This construction permits a relatively inexpensive and yet satisfactory construction for an ice freezing assembly permitting the cubes formed in the tubes to fall freely as soon as the bond between the cubes and the surface of the tubes is broken.

A further object of the invention is to provide in a simple, inexpensive and expedient manner, for proper "blowdown" in the sump of an automatic ice freezing machine. In many localities there is a large proportion of dissolved solids in the water to be frozen. These solids are not frozen and are generally returned to the sump of the machine. After a period of time the proportion of these solids in the sump water can become so large that the ice will be cloudy in appearance. It is, therefore, necessary to occasionally drain a portion of this sump water away to the sewer to keep down the proportion of occluded solids, which is generally termed "blowdown." Sufficient make-up water is added to provide for this loss as well as the amounts of water frozen into ice. It is an object of the invention, therefore, to provide a feeder member attached to the control ice freezing tubes, which feeder continually diverts a portion of the water leaving the control tube to a drain tube for continually draining a portion of the sump water away to the sewer and wherein the feeder comprises a rodlike member for diverting by capillary action a part of the vertically falling water leaving the control tube and wherein the amount of water diverted can be varied by varying the width of the member or by changing the angle between the vertical plane and the member.

The invention consists of the novel constructions, arrangements and devices to be hereinafter described and claimed for carrying out the above-stated objects and such other objects as will appear from the following description of preferred embodiments of the invention described with reference to the accompanying drawings, in which:

Referring now to the drawings, in which like numerals denote like parts throughout the several views, the ice-making machine comprises basically an ice storage portion or bin compartment 11 and an ice-making portion 12. Bin compartment 11 has a door 13 connected thereto by way of a pair of hinges 14 for easy access to the ice cubes stored therein. The ice-making portion 12 rests on and is attached to the bin compartment 11 and has a front panel 15 removably connected thereto by four fastening members such as screws 16 for easy access to the interior.

The ice-making portion 12 of the machine basically comprises three main components; the refrigerating circuit, the water circuit, and the control circuit.

The refrigerating circuit (see Fig. 2) comprises a compressor 17 driven by an electric motor 18. As shown, the two are hermetically sealed within an air tight casing to form a hermetic assembly 19. A hot refrigerant gas line 20 leads from the discharge of the compressor to an air cooled condenser 21. Condenser 21 (see Fig. 3) comprises essentially a round coil section 22 of approximately 270° extent, the coil extending through a plurality of closely spaced fins 23 to increase the heat-exchange capacity of the coil. A fan 24 of any suitable type, driven by an electric motor 25, is provided for circulating cooling air over the condenser 21. A hot refrigerant liquid line 26 leads from the condenser to a liquid refrigerant receiver 27. The liquid refrigerant receiver 27 connects with a pressure reducing valve 28 by way of a liquid line 29. Pressure reducing valve 28 may be of any suitable type, but comprises, preferably, a thermal expansion valve controlled by a bulb 30 connected thereto by way of a capillary 31, all as is well known in the art. A low pressure liquid line 32 leads from valve 28 to a secondary evaporator 33. A control ice-forming tube 34 is provided and is in direct contact with secondary evaporator 33. From the secondary evaporator 33 a refrigerant line 35 leads to a main, or primary evaporator 36.

Evaporator 36 is formed of a plurality of parallel rows of copper tubing 37. Tubing 37 is suitably bonded to a plurality of vertical ice-forming elements 38. It will be appreciated that for every row of tubing there will be a corresponding row of ice cubes formed within the ice-forming elements 38. There will, therefore, be as many rows of tubing as there are ice cubes to be formed within the ice-forming elements 38. The outlet of evaporator 36 is connected to the inlet of compressor 17 through a cold gas suction line 39. Line 39 has a U shaped drop leg 40 formed therein. Bulb 30 is fastened in heat-exchange relation with the down flow portion of drop leg 40 so that it will not be influenced by liquid refrigerant passing through the suction line 39 once the liquid has passed the bulb. Further, as seen clearly in Fig. 3, a portion of the cold gas line 39 is in heat-exchange relation with a portion of the hot liquid refrigerant line 26 to remove heat from hot refrigerant liquid flowing in line 26. A hot gas by-pass connection 41 controlled by a hot gas defrost valve 42 operated by a solenoid 43 connects lines 20 and 32.

Ice-forming elements 38 (see Figs. 6 and 7) each comprises a vertically extending channel member having an ice-forming surface 44 and in-turned end portions 45. The angle between each surface 44 and adjacent end portions 45, designated as A, must be greater than 90°. It will be seen that, in effect, elements 38 are in reality half-hexagons in cross section. With the angle A greater than 90°, ice frozen to the surface 44 and confined between adjacent end portions 45 is able to fall freely between the end portions 45, as soon as the bond holding it to the freezing element 38 is broken. This, of course, would not be true if the angle A were 90° or less.

Figures 6, 9, 10, 11:
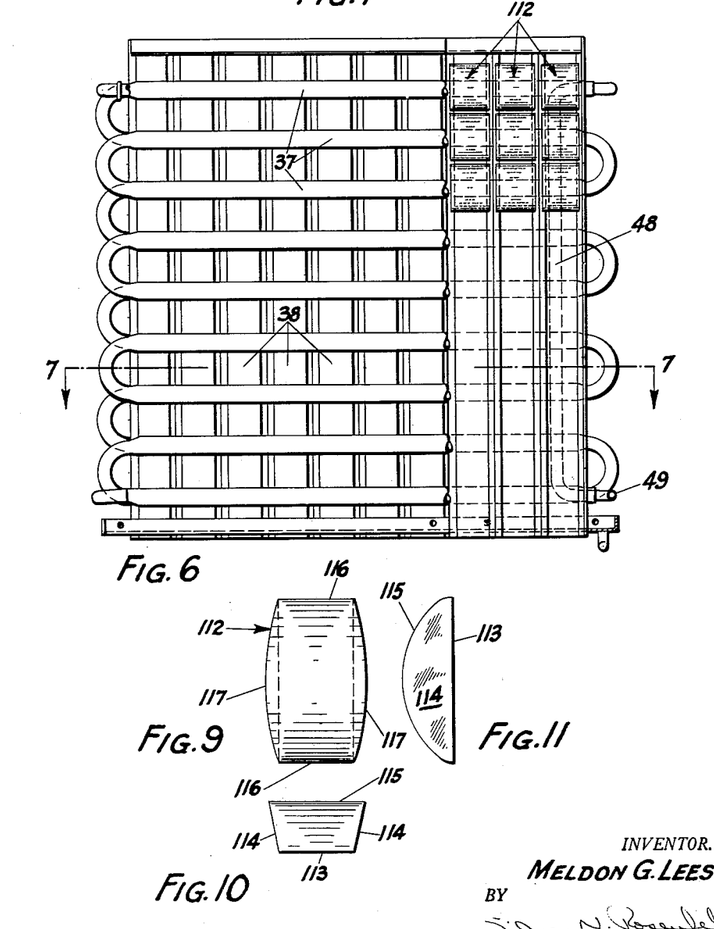
Fig. 6 is a front elevational view of the ice-forming assembly of the machine taken on the line 6—6 of Fig. 7.
Figures 9, 10 and 11 are respective plan, front and side views of an ice cube formed in either the ice-forming elements of Fig. 7 or Fig. 8.

As can clearly be seen in Fig. 6, the rows of tubing 37 of evaporator 36 are suitably bonded to adjacent surfaces 44 of elements 38 to freeze ice thereto. Ice freezing elements 38 are formed of a material which is a poor conductor of heat, such as stainless steel. Ice will, therefore, form only at points closely adjacent to the region where the tubing 37 is bonded to the elements 38, to form individual ice cubes.

Figure 7:
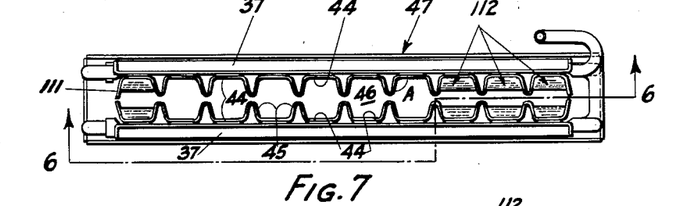
Fig. 7 is a sectional view of the ice-forming assembly taken on the line 7—7 of Fig. 6.

Fig. 7 shows a preferred form of construction of the ice-forming elements 38. In order to form the elements 38, a suitable metallic sheet is so folded that a plurality of elements 38 are formed thereby with the elements 38 all being connected together. It will be further appreciated that where two such metallic sheets are joined together at their edges, as shown, a double construction results comprising a plurality of hexagonal-like passageways 46 with ice cubes being formed opposite one another on opposed surfaces 44, for a maximum of ice cubes in a minimum amount of space. It will be appreciated that in such a construction, the evaporator 36 will have parallel rows of tubing 37 thereof suitably bonded to both sides of passageways 46 to form a freezing assembly 47. It is, of course, necessary that the various controls function such that the ice cubes will be harvested before they reach a size where they will join and fuse together, which is provided for by properly proportioning control tube 34.

The tubing 37 is so constructed and arranged on the ice freezing elements 38 that it runs from the bottom to the top thereof. The reason for this is that during the harvesting cycle hot refrigerant gas flowing through the evaporator will progressively free the bottom-most cubes from the freezing elements before the upper, allowing for unimpeded fall of each row of cubes therethrough. It will be appreciated that were the reverse procedure followed, and the hot gas introduced across the top of the freezing elements 38, the first row of cubes to be harvested would be the upper-most row of cubes, these cubes would then be impeded in their fall by the still unharvested cubes below. As can be seen in Fig. 6, the tubing is wound in a sinuous form on one side of the evaporator assembly from the bottom to top and then comes down by way of a down leg 48 and cross-over 49 to the other side of the assembly, being wound on that side also in a sinuous manner from bottom to top. The tubing is first wound on the rear, or back side of the assembly and then on the front, or forward side. It will be appreciated, however, that this procedure could be reversed so long as the tubing is sinuously wound on first one side and then the other from the bottom to the top thereof.

An inclined rack 50 (see Fig. 3) is positioned beneath the ice-forming elements 38 to guide harvested ice cubes into bin 11. The rack may be so constructed of an open wire grillwork so that water will pass therethrough while the passage of ice cubes will be prevented.

Figure 12:
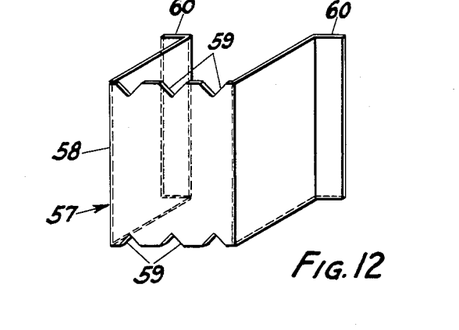
Fig. 12 is a perspective view of a water distributor in the machine.
Figure 13:
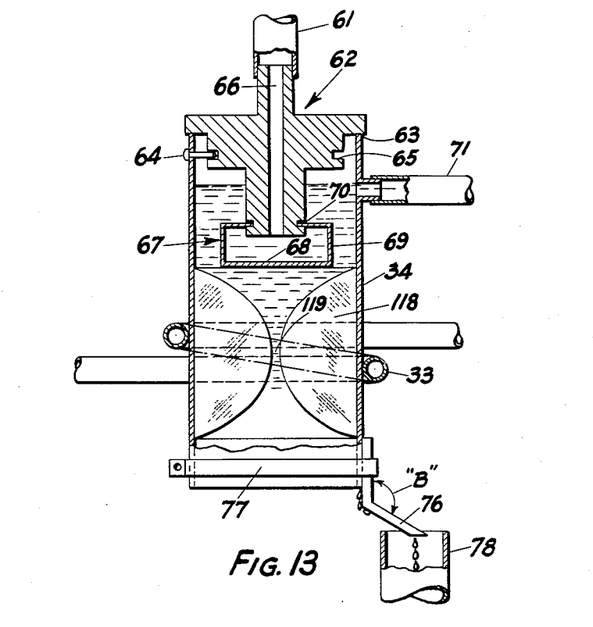
Fig. 13 is a sectional view taken on the line 13—13 of Fig. 4.

Water is circulated within the assembly 47 and over the surfaces 44 and 45 so that it may be frozen thereto to produce ice. A sump 51 beneath assembly 47 is provided for maintaining a reservoir of water available for this purpose. A pump 52 driven by an electric motor 53 has its inlet within the body of water and has its discharge connected to a line 54 leading to a water header 55. Water header 55 has a plurality of spray nozzles 56 attached thereto, there being one spray nozzle for each passageway 46. A water distributor 57 is positioned adjacent the top of each passageway 46. As shown in Fig. 12, the distributor 57 comprises a horizontal flat deflector portion 58 for receiving water from the spray nozzles 56 and for distributing it evenly over surfaces 44 and 45. Deflector portion 58 has a plurality of notches 59 at its sides to insure that no stoppage of water flow can occur should the edge of the deflector be adjacent a surface 44, since the water will then flow through notches 59. The distributor 57 is further provided with two arm portions 60, which rest atop the passageways 47 and maintain the distributor in position. Water header 55 also has an outlet line 61 leading to control tube 34 and terminating just thereabove. Outlet line 61 terminates in a nozzle 62. Nozzle 62 has a shoulder portion 63 which rests on top of control tube 34 for supporting the nozzle therein. A set screw 64 is inserted through a suitable opening in the wall of control tube 34 and into a notch 65 provided in nozzle 62 for maintaining the nozzle in position. A water passageway 66 extends longitudinally through the nozzle 62. A water deflector 67 is provided and comprises a round disc-like body portion 68 having arms 69. A channel 70 is provided in the nozzle 62 for receiving the arms 69 to maintain the deflector positioned beneath the nozzle.

A cold water line 71 is provided in communication with control tube 34 for receiving backed up water from within control tube 34, as will be hereinafter described. Line 71 discharges into a conduit 72 which leads back to the sump 51. A valve 73 controls flow of make-up water through a line 74 connected to any suitable source of water. Valve 73 is automatically operated by a float 75 which maintains an approximately constant level of water within the sump 51.

Means are provided for constantly diverting a minute portion of water en route to the pump 51 in order to prevent the accumulation of occluded solids therein, known as "blowdown." This comprises a feeder rod 76, positioned adjacent the control ice-forming element 34 for diverting by capillary action a portion of the water falling from tube 34 into the sump 51. As shown, feeder rod 76 is attached to the control tube 34 by means of a strap 77. A drain tube 78 is provided for receiving the drip off of the feeder rod 76. The amount of water diverted by feeder rod 76 into drain 78 can be varied by either of two methods: (1) increasing the angle "B" between the rod and the vertical plane will provide for more "blowdown"; or (2) by varying the circumference of the rod; the greater the circumference the greater the amount of water diverted.

Suitable controls are provided for rendering the entire operation of the machine automatic. These comprise a control for initiating the freezing operation, wherein the circulated water is frozen into cubes; a control for terminating the freezing operation and initiating a harvesting operation wherein the bond between the cubes and the ice-forming element is broken so that the cubes may fall to the bin 11; and a control element for automatically terminating the operation of the machine when the ice in the bin has reached a predetermined height.

Referring again to Fig. 2, the control for initiating freezing operation comprises primarily a bellows 79 operating a switch 80 and connected to a control bulb 81 by way of a capillary 82. Bellows 79, bulb 81 and capillary 82 are filled with a suitable heat-exchange fluid which fluid suitably expands and contracts bellows 79 to open and close switch 80 upon the attainment of predetermined temperature conditions; for example, the cut-in temperature at which the switch 80 closes may be 60° F. and the cut-out temperature may be 29° F. An inspection of Fig. 3 reveals that bellows 79 is located on the downstream side of condenser 21 so that it is in the path of heated air flowing therethrough. This will insure that bellows 79 will always be at a higher temperature than bulb 81. Control bulb 81 is suitably placed adjacent a portion of the suction line 39 to be influenced by the temperature of gas flowing therethrough.

The control for initiating the harvesting operation comprises a bellows 83 operating a switch 84 and connected to a control bulb 85 by way of a capillary 86. Control bulb 85 is placed in the conduit 72 in the path of water diverted through line 71 from the control tube 34 by the formation of ice therein. Bellows 83, bulb 85 and capillary 86 are also filled with a suitable heat-exchange fluid for actuating bellows 83 to open and close switch 84 upon predetermined temperature being reached at the bulb 85; i.e. cut-in (closing switch 84) at 43° F. and cut-out at 38° F.

A third bellows 87 operating a switch 88 and controlled by a bulb 89 connected thereto by way of a capillary 90, is provided for terminating the operation of the machine when ice within the bin 11 has built up to a predetermined level. Control bulb 89 is connected to the bin wall near the top thereof. When the ice within the bin builds up to a position where it is in close proximity to bulb 89, the fluid within the bulb is chilled, contracting bellows 87, opening switch 88, thereby discontinuing operation of the machine.

The electrical circuit will now be described with reference to Fig. 2. Main electrical lines 91 and 92, controlled by a switch 93, serve to conduct electrical power derived from any suitable source to the various electrical instrumentalities. Switch 88 is connected into line 92 so that the operation of the entire machine may be discontinued when ice in the bin has reached the aforementioned predetermined level, as set out above. The motor 18 operating compressor 17 is directly connected across lines 91 and 92 by way of leads 94 and 95. A double throw solenoid switch 96 is provided having a switch lever 97 and a winding 98 including terminals 99 and 100. Terminal 99 is connected to line 91 by way of a line 101 including switch 84, a line 102 and line 103 including switch 80. The other terminal 100 of winding 98 is directly connected to line 92 to complete the circuit. Electric motor 53 operating the pump 52 is connected across lines 91 and 92 by leads 104 and 105 and switch lever 97. The electric motor 25 operating the fan 24 is connected across lines 91 and 92 by leads 106 and 107 and switch lever 97. The hot gas defrost valve solenoid 43 is connected across lines 91 and 92 by leads 108 and 109 and switch lever 97. A line 110 is provided connecting lines 102 and 104 for purposes later to be explained.

I have now described a complete embodiment of my ice making machine including a preferred form of evaporator assembly 47. However, as shown in Fig. 8, an alternate form of evaporator assembly 47-A, which may be used in place of the assembly 47, may be provided. Assembly 47-A ocmprises a plurality of individual hexagonal tubes 111. Tubes 111 are suitably formed of a sheet material similar to that used in elements 38. It will be apparent that tubes 111 are each individually formed with no connections therebetween except that they are suitably bonded to the evaporator 36 which, as in the embodiment of Fig. 7, is formed of a pair of sinously wound sections of tubing 37 on opposite sides of the hexagonal tubes 111.

Figure 1:
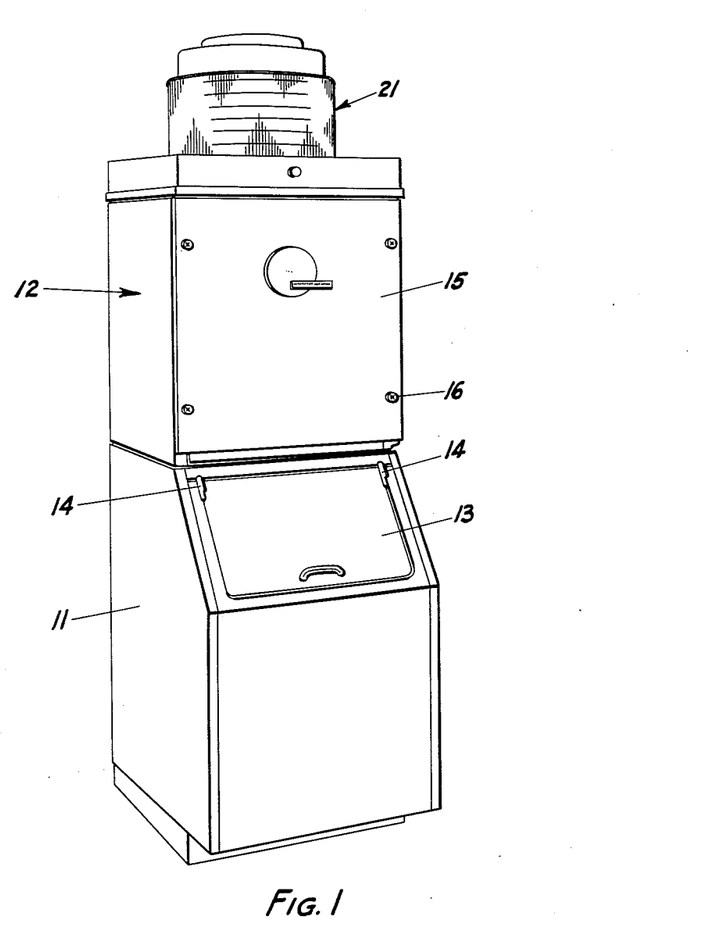
Fig. 1 is a perspective view of an automatic ice making machine embodying the principles of the invention.
Figures 2, 8:
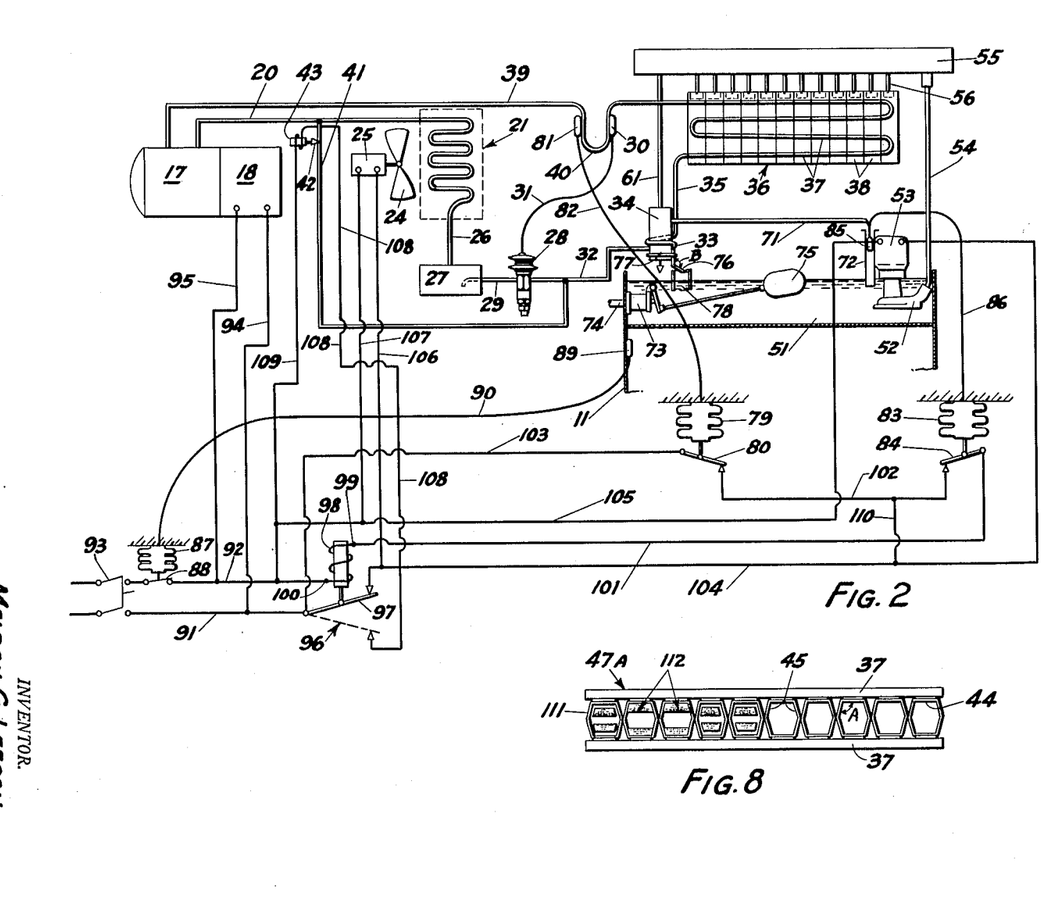
Fig. 2 is a schematic representation of the operating mechanisms of the machine.
Fig. 8 is a view similar to Fig. 7 showing another embodiment of the ice-forming assembly.
Figure 3:
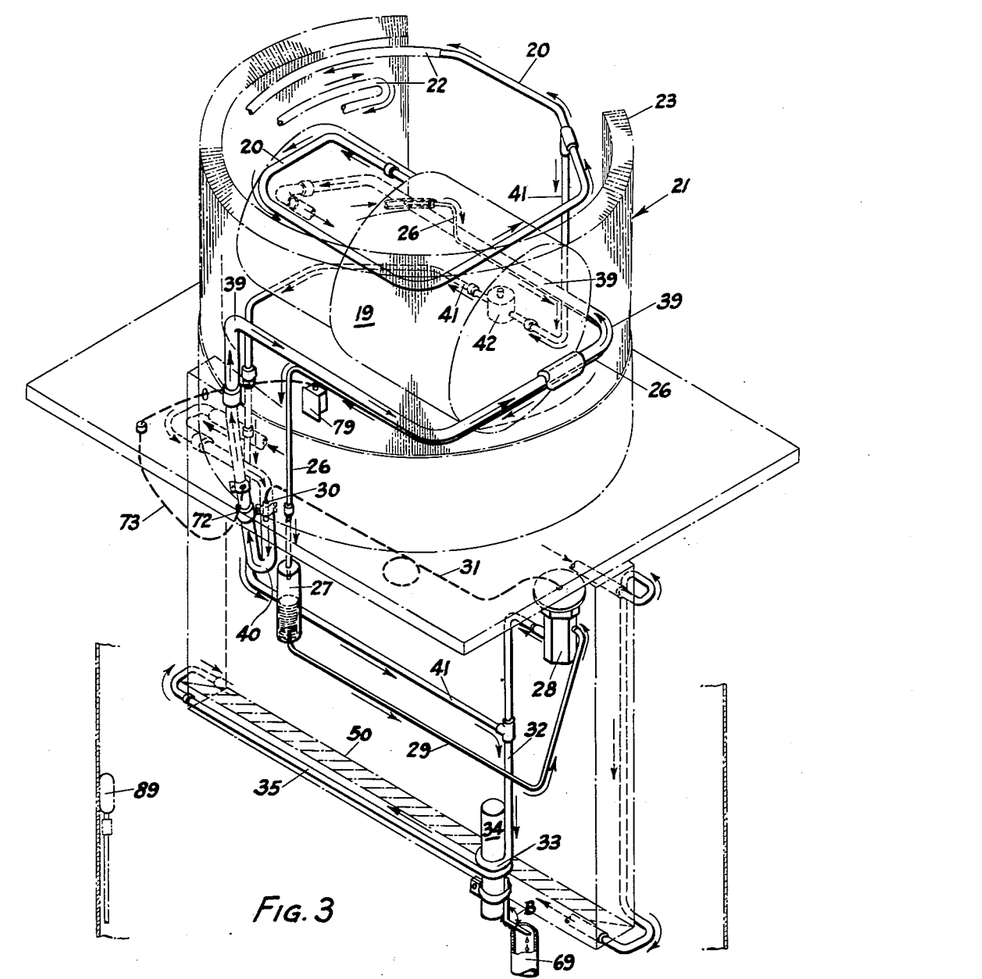
Fig. 3 is a perspective view of a portion of the machine showing the refrigerant flow paths.
Figure 4:
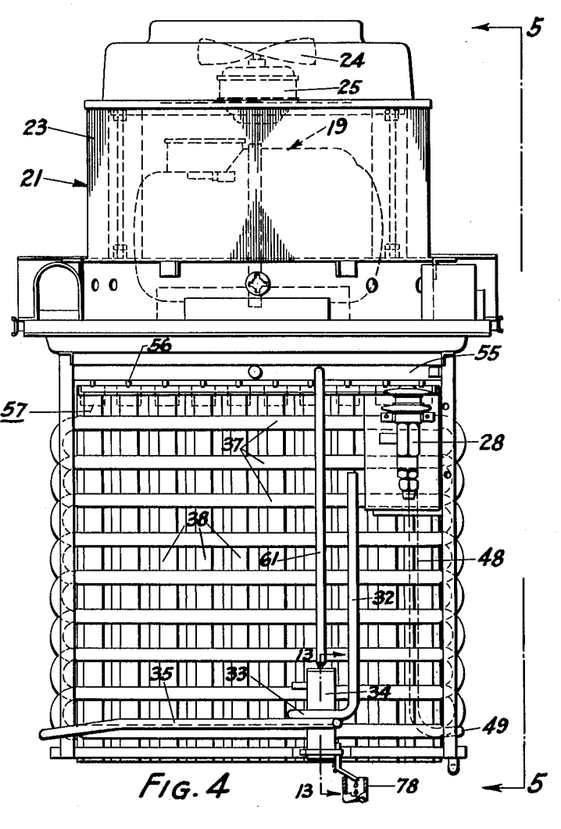
Fig. 4 is a front elevational view showing the evaporator assembly and the condensing section of the machine.
Figure 5:
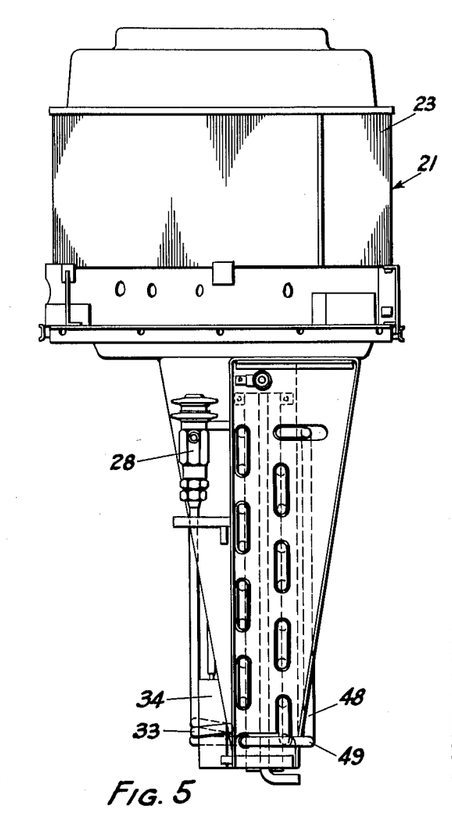
Fig. 5 is a side elevational view taken on the line 5—5 of Fig. 4.

For convenience in the claims, both the Fig. 7 embodiment and the Fig. 8 embodiment shall be referred to as comprising hexagonal "tubes," even though the passageways of the Fig. 7 embodiment are not tubes as the term is commonly understood.

The operation of the device will now be described with particular reference to Fig. 2. The master switch 93 is closed in order to connect the source of power with the machine to put the machine in operation. Under starting conditions, all three of the switches 80, 84 and 88 are closed, and an electrical circuit is set up to energize solenoid switch 96 controlling the switch lever 97. The circuit is as follows: current flows through line 91, line 103, switch 80, line 102, switch 84, line 101 and through the solenoid winding 98 and back to line 92 to actuate the solenoid switch lever 97 to the position shown in solid lines in Fig. 2. With switch lever 97 in its upper actuated position, the electric motors 53 and 25 driving the pump 52 and the fan 24 respectively will be actuated as follows: current flows through line 91 across the switch lever 97 and through line 104 to one side of electric motor 53. From the other side of the motor the current flows by way of line 105 to line 109 and then to line 92 to complete the circuit to motor 53. The electric motor 25 driving fan 24 is connected by lines 106 and 107 directly across lines 104 and 105 so that the two motors 25 and 53 are both actuated or deactuated in unison. Current flows to the compressor motor 18 by way of lines 91 and 94 and then flows through line 95 back to line 92 to complete the circuit. It will be apaprent that motor 18 is always in operation so long as switches 88 and 93 are closed.

Pump 52 withdraws water from sump 51 and discharges through line 54 to water header 55. From water header 55 water flows through nozzles 56 onto distributors 57. The water then flows over the distributors 57 and thence onto the surfaces 44 and 45 of ice forming elements 38 and downwardly thereon. The junction of an ice forming element 38 with a tube 37 forms a freezing area with the water progressively freezing into cubes adjacent such juncture area as the water continues to flow onto the surfaces 44 and 45.

Cube 112 takes the form shown in igs. 9, 10 and 11. Cube 112 is defined by a flat rectangular back surface 113, a pair of contiguous adjacent surfaces 114 flared outwardly therefrom having a semi-elliptical configuration and a front curved surface 115 contiguous at its ends with end edges 116 on surface 113 and at its sides with front edges 117 of surfaces 114. Surface 113 is formed on surface 44 of element 38. The surfaces 114 are formed on end portions 45. The cube is thickest at that point directly opposite the aforementioned freezing area on the surface 44.

In addition to the flow through nozzles 56 water also flows through line 61 through nozzle 62 and onto deflector 67 from whence it is distributed along the side of control tube 34. A control cube 118 is formed within tube 34 adjacent the point where evaporator 33 is bonded to the control tube. The cube is gradually built up by continual flow of water within tube 34 to a point wherein the passage of water through the control tube is impeded by the narrow opening 119 through the cube 118. Water not frozen into ice flows down the tube 34 and directly into the sump 51.

During the entire time that water is being circulated through control tube 34 under the influence of pump 52, a certain small portion of the water flowing from the control tube en route to the sump will flow continuously onto feeder rod 76 and thence be directed to drain tube 78 providing expeditiously for proper "blowdown."

Evaporators 33 and 36 are maintained at a below freezing temperature by the passage of a cold liquid refrigerant therethrough. The cold liquid refrigerant is provided for by means of a conventional refrigerating system which has been described in brief.

High pressure refrigerant gas leaves compressor 17 and is delivered to condenser 21. It is cooled therein by fan 24, becoming condensed into a liquid. The liquid refrigerant then flows through valve 28 wherein its pressure and corresponding temperature are reduced. The now cold liquid then flows through secondary evaporator 33 and primary evaporator 36. In flowing through the coils 37 of evaporator 36 the cold liquid refrigerant picks up heat from water flowing over surfaces 44 and 45 becoming gaseous thereby and then flows through drop leg 40 and suction line 39 back to the inlet of compressor 17.

A short time after the system is in operation, the temperature of the gas flowing through drop leg 40 reaches a point such that the fluid in control bulb 81 is chilled down to 29° F., bellows 79 contracts sufficiently to open switch 80. Since the opening of switch 80 would normally break the circuit to solenoid 98, a separate holding circuit must be provided for maintaining solenoid 98 energized. The holding circuit allows current to flow as follows: current flows from line 91 across switch lever 97 through lines 104 and 110 and part way through line 102 across switch 84 and line 101 through the solenoid windings 98 and back to line 92 to complete the circuit. Switch lever 97, therefore, remains in its upper actuated position.

As soon as ice has built up in the control tube 34 to a thickness sufficient to impede flow of water therethrough, the water backs up and flows through line 71 over control bulb 85 chilling the bulb positioned in conduit 72. When the temperature of fluid in the control bulb 85 reaches 38° F., by virtue of the cold water passing thereover, bellows 83 contracts sufficiently to open switch 84. This then breaks the holding circuit to the solenoid coil 98 allowing switch lever 97 to fall to its de-actuated position as shown in dotted lines in Fig. 2. This breaks the circuit to the electric motors 25 and 53 operating the pump 52 and fan 24 and they both stop operating. As soon as pump 52 is shut down, chilled water no longer flows over bulb 85, and the residual heat in motor 53 positioned in proximity to the bulb 85 quickly warms the bulb to its cut-in temperature of 43° F. to expand bellows 83 and close switch 84. Switch 80, however, remains open and cold gas continues to flow through drop leg 40.

With switch lever 97 in its de-actuated position, an electrical circuit is completed to energize solenoid 43 to actuate the hot gas defrost valve 42 to its open position as follows: current flows from line 91 and through switch lever 97 and line 108 to the solenoid 43 operating valve 42 and thence through line 109 back to line 92 to complete the circuit. Astuation of the defrost valve 42 to an open position allows hot gas from the compressor 17 to bypass the condenser 21, receiver 27 and thermal valve 28 and flow instead through bypass 41 into line 32, thence through control evaporator 33 and primary evaporator 36 giving up its heat thereon to harvest the ice formed within the control tube 34 and on the primary freezing surfaces 44 and 45. The gas then leaves evaporator 36 and flows through down leg 40 and suction line 39 back to the inlet of compressor 17. The gas is sufficiently cooled in its passage through evaporator 36 so that bulb 81 will remain at a temperature below 60° F., thereby maintaining switch 80 in its open position. As the bond between the cubes and the freezing surfaces is broken, the cubes fall freely between end portions 45 and are guided by rack 50 into bin 11. The ice formed in the control tube 34 and harvested therefrom falls into the sump 51 and melts therein.

As the last cubes fall from freezing elements 38, then the heat contained in the gas flowing through the evaporator tube rows 37 is transmitted to suction line 39 warming the same. At the predetermined temperature of 60° F., bellows 79 under the influence of bulb 81 expands sufficiently to close switch 80. With switch 84 previously closed, solenoid winding 98 is reenergized to again initiate the freezing cycle. Switch lever 97 will then be in its upper, or actuated, position breaking the circuit through solenoid 43.

It will be apparent that I have provided a small ice-making machine well adapted for carrying out the objects set out hereinabove. Individual cubes of ice of substantially uniform size will be frozen to ice freezing surfaces provided and will be harvested therefrom responsive to a backing up of water from control tube 34 when ice has formed therein sufficiently to impede the flow of water therethrough. The size of the cubes formed on the freezing surfaces may be varied merely by varying the size of the control tube.

By reason of the design of the ice forming elements, cubes formed therein will fall freely once the bond between the element and the cube is broken.

I have provided for proper "blowdown" in a novel and expeditious manner, yet at a very low cost.

I have also provided an ice cube of very attractive configuration; one which will melt slowly thereby maintaining a drink cold for a longer portion of time; and because of its configuration, a cube that will nest together in a glass more compactly thereby providing more cooling surface and also a more pleasing appearance.

The entire device is characterized by its dearth of moving parts which allows for a trouble-free operation.

I wish it to be understood that my invention is not to be limited to the specific constructions and arrangements shown and described, except only insofar as the claims may be so limited, as it will be apparent to those skilled in the art that changes may be made without departing from the principles of the invention.

What is claimed is:

1. An ice maker comprising, in combination, an ice freezing surface; a control ice freezing tube; means for flowing water to be frozen over said surface and through said tube; a refrigerant evaporator in contact with said surface to form ice thereon, a portion of said evaporator being in contact with said tube to form ice therein; and means responsive to the restriction to flow of water through the freezing tube by the formation of ice therein to discontinue the freezing operation on said surface and to initiate a harvesting operation.

2. An ice cube maker comprising, in combination, an ice freezing surface; a control ice freezing tube; means for flowing water to be frozen over said surface and through said control tube; a refrigerant evaporator in contact with spaced portions of said surface to form ice cubes thereon, a portion of said evaporator encircling said control tube to form ice therein; and means responsive to the restriction to flow of water through the control tube by the formation of ice therein to discontinue the freezing operation and to initiate a harvesting operation, whereby the size of said cubes may be varied by varying the size of said control tube.

3. An ice cube maker comprising, in combination, a pair of ice freezing surfaces; a control ice freezing tube; means for flowing water to be frozen over said surfaces and through said control tube; a refrigerant evaporator in contact with opposed areas of said surfaces to form opposed ice cubes thereon, a portion of said evaporator being in contact with said control tube to form ice threrein; means responsive to the restriction to flow of water through the control tube by the formation of ice therein to discontinue the freezing operation and to initiate a harvesting operation, said control freezing tube being so proportioned that there will be a restriction to flow of water therethrough prior to the cubes on the said freezing surfaces reaching such a size that will join together therein.

4. An automatic ice cube maker comprising, in combination, a vertical freezing element including a freezing surface and in-turned end portions; means for flowing water to be frozen over said surface a refrigerant evaporator solely in contact with said freezing surface to form ice cubes thereon confined between said end portions; said surface and in-turned end portions having an included angle greater than 90°, whereby ice cubes formed on said freezing surface and released therefrom will fall freely without binding between said in-turned end portions.

5. An automatic ice cube maker comprising, in combination, an ice freezing assembly comprising a bank of vertical hexagonal freezing tubes; means for flowing water to be frozen through said tubes; a refrigerant evaporator in contact with opposite sides of said tubes to form opposed cubes of ice therein; means for breaking the bond between said cubes and said tubes when said cubes have attained a predetermined size and prior to opposed cubes becoming joined, said freed cubes thereby falling freely through said tubes without binding therein.

6. The device of claim 5 wherein said bank of tubes is formed from two folded metal sheets joined at the edge portions thereof, each said sheet being folded in such a fashion that half-hexagon passageways are formed therein.

7. A method of producing ice of substantially uniform thickness under varying operating conditions comprising the steps of flowing water to be frozen over a surface; refrigerating the surface to freeze the water thereon; flowing water through a control tube to be frozen therein; refrigerating said control tube; and utilizing water diverted from said tube by the restriction to flow therethrough to terminate the freezing operation on said surface.

8. An ice maker comprising, in combination, an ice freezing surface; an ice freezing tube; means for flowing water to be frozen over said surface and through said tube; a refrigerating system including an evaporator in contact with said surface to form ice thereon, a portion of said evaporator encircling said tube to form ice therein; means responsive to the restriction to flow of water through the freezing tube by the formation of ice therein to discontinue the freezing operation on said surface and to initiate a harvesting operation; and means for terminating the harvesting operation and initiating the freezing operation.

9. An ice cube maker comprising, in combination, a bank of vertical ice freezing tubes; a control ice freezing tube; means for flowing water to be frozen through said vertical and control tubes; a refrigerating system including a refrigerant evaporator in contact with opposite sides of said vertical tubes at spaced portions thereof to form spaced, opposed ice cubes therein, a portion of said evaporator encircling said control tube to form ice therein; means responsive to the restriction to flow of water through the control tube by the formation of ice therein for supplying hot refrigerant gas to the evaporator whereby the freezing operation is terminated and a harvesting operation initiated; and means responsive to a predetermined high evaporator temperature for terminating the harvesting operation and initiating the freezing operation.

10. In an automatic ice maker of the type comprising an ice freezing surface, a refrigerant evaporator in contact with said surface to form ice thereon and means for flowing water to be frozen over said surface, that improvement comprising control means for terminating the freezing operation and initiating a harvesting operation upon the ice reaching a selected thickness on said surface, said control means comprising a tube, a refrigerant evaporator in contact therewith to form ice therein; and means responsive to the restriction to flow of water to be frozen through said tube by the formation of ice therein, for terminating said freezing operation and initiating said harvesting operation, whereby the thickness of said ice formed on said surface will remain substantially constant under variable conditions of operation.

11. An ice freezing assembly comprising a first sheet so folded that a plurality of channels are formed therein, said channels in cross section having the configuration of a half-hexagon; a second sheet, said second sheet being a mirror duplicate of said first sheet and joined thereto forming a plurality of hexagonal passageways; and a refrigerant evaporator formed of two sinuous sections of tubing bonded to said hexagonal passageways and on opposite sides thereof.

12. An ice maker comprising, in combination, an ice freezing surface; a control ice freezing tube; means for flowing water to be frozen over said surface and through said tube; a refrigerant evaporator in contact with said surface to form ice thereon, a portion of said evaporator being in contact with said tube to form ice therein; means providing a passageway for water flow from said tube for water unable to flow through said tube by the formation of ice therein; and thermal responsive means placed in heat-exchange relation with said passageway for discontinuing the freezing operation on said surface.

13. An ice maker comprising, in combination, an ice freezing surface; a control ice freezing tube; means for flowing water to be frozen over said surface and through said tube; a refrigerating system including an evaporator in contact with said surface to form ice thereon, a portion of said evaporator being in contact with said tube to form ice therein; means providing a passageway for water flow from said tube for water unable to flow through said tube by the formation of ice therein; thermal responsive means placed in heat-exchange relation with said passageway for discontinuing the freezing operation on said surface; and means actuated by said thermal means for passing hot refrigerant gas through said evaporator for harvesting ice formed on said freezing surface.

14. In an automatic ice maker of the type comprising a vertical freezing tube for freezing cubes of ice on opposed inner walls thereof, a water distributor for said tube comprising a horizontal rectangular deflector portion having first opposed sides adapted to be positioned adjacent said opposed inner walls of said tubes and second opposed sides for attachment to arm portions, arm portions attached to said second opposed sides of said deflector portion and extending the full length of said sides whereby water falling on said deflector portion flows only to said opposed inner walls of said tube, said arm portions being so formed, at the free ends thereof, to rest on the upper end of said tube for retaining said distributor within said tube.

15. In an automatic ice maker of the type comprising a vertical freezing tube for freezing cubes of ice on opposed inner walls thereof, a water distributor for said tube comprising a horizontal rectangular deflector portion having first opposed sides adapted to be positioned adjacent said opposed inner walls of said tubes and second opposed sides for attachment to arm portions, said first opposed sides each including a notch therein for flow of water therethrough, arm portions attached to said second opposed sides of said deflector portion and extending the full length of said sides whereby water falling on said deflector portion flows only to said opposed inner walls of said tube, said arm portions being so formed, at the free ends thereof, to rest on the upper end of said tube for retaining said distributor within said tube.

16. An ice maker comprising, in combination, an ice freezing surface; means for flowing water to be frozen over said surface; a refrigerant evaporator in contact with said surface to form ice thereon; a water sump positioned beneath said surface to receive water from said surface in excess of that frozen thereon; a rod member inclined from the vertical, positioned in the water flow from said surface, for continually diverting a portion of said water from said sump; and a drain tube for receiving said diverted water.

References Cited in the file of this patent

UNITED STATES PATENTS

| | | |
|---|---|---|
| 2,536,217 | Pownall | Jan. 2, 1951 |
| 2,593,874 | Grandia | Apr. 22, 1952 |
| 2,703,964 | Ashley | Mar. 15, 1955 |
| 2,775,096 | Ashley | Dec. 25, 1956 |
| 2,775,098 | MacLeod | Dec. 25, 1956 |

UNITED STATES PATENT OFFICE
CERTIFICATE OF CORRECTION

Patent No. 2,983,109            May 9, 1961

Meldon G. Leeson

It is hereby certified that error appears in the above numbered patent requiring correction and that the said Letters Patent should read as corrected below.

Column 8, line 28, for "on surface 113" read -- of surface 113 --; column 9, line 32, for "Astuation" read -- Actuation --; column 10, line 50, after "that" insert -- they --.

Signed and sealed this 26th day of September 1961.

(SEAL)
Attest:

ERNEST W. SWIDER            DAVID L. LADD
Attesting Officer            Commissioner of Patents

USCOMM-DC